(12) United States Patent
Keller

(10) Patent No.: US 7,967,115 B2
(45) Date of Patent: Jun. 28, 2011

(54) BRAKE DISC, PARTICULARLY AN INTERNALLY VENTILATED BRAKE DISC

(75) Inventor: Holger Keller, Sinsheim (DE)

(73) Assignee: Otto Zimmermann GmbH, Sinsheim-Duehren (DE)

( * ) Notice: Subject to any disclaimer, the term of this patent is extended or adjusted under 35 U.S.C. 154(b) by 855 days.

(21) Appl. No.: 11/398,501

(22) Filed: Apr. 4, 2006

(65) Prior Publication Data

US 2006/0243547 A1 Nov. 2, 2006

(30) Foreign Application Priority Data

Apr. 4, 2005 (DE) .................. 10 2005 015 552

(51) Int. Cl.
*F16D 65/12* (2006.01)
(52) U.S. Cl. .................... 188/218 XL; 188/264 A
(58) Field of Classification Search ............ 188/218 XL, 188/264 A, 264 AA, 73.1, 71.6; 192/70.12, 192/113.1, 113.2, 113.21, 113.23
See application file for complete search history.

(56) References Cited

U.S. PATENT DOCUMENTS

| | | | | |
|---|---|---|---|---|
| 4,108,286 A | * | 8/1978 | Gagarin | 188/218 XL |
| 5,109,960 A | * | 5/1992 | Gunther | 188/218 XL |
| 5,429,214 A | * | 7/1995 | Wiebelhaus et al. | 188/218 XL |
| 5,823,303 A | * | 10/1998 | Schwarz et al. | 188/218 XL |
| 6,523,651 B2 | * | 2/2003 | Schaus et al. | 188/218 XL |
| 6,564,912 B1 | * | 5/2003 | Koschinat | 188/218 XL |
| 7,467,694 B2 | * | 12/2008 | Botsch | 188/218 XL |

FOREIGN PATENT DOCUMENTS

| | | |
|---|---|---|
| DE | 1 052 757 C | 3/1959 |
| DE | 1 134 409 B | 8/1962 |
| DE | 29 33 215 A | 2/1981 |
| DE | 34 36 729 A1 | 4/1986 |
| DE | 43 32 951 A1 | 8/1994 |
| EP | 0 198 217 A1 | 10/1986 |
| EP | 1 092 889 A1 | 4/2001 |

* cited by examiner

*Primary Examiner* — Pam Rodriguez
(74) *Attorney, Agent, or Firm* — Kriegsman & Kriegsman

(57) ABSTRACT

The invention relates to a brake disc, particularly an internally ventilated brake disc, having at least one friction ring (12), which is connected to a brake-disc chamber (14) via fastening elements, the fastening elements taking the form of threaded bolts (19), which have a cylindrical section (22) and a threaded section (21), which can be screwed into the brake-disc chamber (14) in such a way that the cylindrical section (22) of the threaded bolt (19) extends outward in the radial force direction over an outer circumference (25) of the brake-disc chamber (14), and that the cylindrical sections (22) engage in holding sections (34) of the friction ring (12) and take up the friction ring so as to form an annular gap (36) with respect to the brake-disc chamber (14).

10 Claims, 2 Drawing Sheets

BRAKE DISC, PARTICULARLY AN INTERNALLY VENTILATED BRAKE DISC

BACKGROUND OF THE INVENTION

The invention relates to a brake disc, particularly an internally ventilated brake disc, having at least one friction ring, which is connected to a brake-disc chamber via fastening elements.

Known from EP 198 217 A1 is a two-part brake disc. Provided on a brake-disc chamber is a receiving area for a friction ring. The friction ring is supported around its entire circumference on the receiving area of the brake-disc chamber. Furthermore, the friction ring has a shoulder in order to position the friction ring in the proper position in the axial direction in relation to the receiving section of the brake-disc chamber. Provided for fixing the friction ring in position in relation to the brake-disc chamber are screws, which are inserted into the cooling ducts of the friction ring that run radially outward. The size of the screw head is adapted to the width, but not to the length of the oval cooling ducts.

This embodiment has the drawback that a floating mounting of the friction ring in relation to the brake-disc chamber is enabled only in the cold state and only in the axial direction. In addition, this two-part brake disc has the drawback that the mounting is complicated and made difficult, particularly the insertion and removal of the fastening screws arranged in the radially outward running ventilation ducts. In the cooled state, the friction ring and the brake-disc chamber already rest against each other. During operation, tensions arise between the outer circumference of the brake-disc chamber and the inner circumference of the friction ring on account of thermal expansion. Accordingly, there occurs a shielding of the friction ring, which leads to a substantial deterioration of the braking properties and is augmented by the shoulder of the friction ring resting on the brake-disc chamber.

SUMMARY OF THE INVENTION

The invention is therefore based on the problem of creating a brake disc, particularly an internally ventilated brake disc that makes possible a simple mounting as well as a high braking effect under high mechanical and thermal loads.

In accordance with the invention, this problem is solved by a brake disc in which a friction ring is connected to the brake-disc chamber by means of fastening elements, which take the form of threaded bolts, these threaded bolts having a cylindrical section and a threaded section and the threaded bolts can be screwed into the brake-disc chamber in such a way that the cylindrical section of the threaded bolt extends outward, protruding radially with respect to the brake-disc chamber, and that the cylindrical sections engage in holding sections of the friction ring and take up the friction ring so as to form an annular gap with respect to the brake-disc chamber.

The advantage thereby achieved is that the friction ring has a floating mounting in relation to the brake-disc chamber. Mechanical and thermal loads are transmitted to the brake-disc chamber via the threaded bolts, which engage in the friction ring in a form-fitting manner. The radial arrangement of the threaded bolts results in an unhindered thermal expansion of the friction ring in relation to the brake-disc chamber. The formation of a ring gap ensures that, during thermal expansion, the friction ring does not rest on the brake-disc chamber. The arrangement of the invention prevents the danger of shielding the friction ring.

The brake-disc chamber preferably has a cylindrical fastening section with several through-holes for receiving the threaded bolts, which can be inserted into the through-holes from the inside toward the outside. In this way, the mounting of the threaded bolts is simplified substantially. The brake-disc chamber is readily accessible from an inner side or an axis of rotation. Beyond this, cooling ducts in the friction ring can have any shape, because access to the threaded bolts via the cooling ducts is not required. In this way, for example, it is possible to arrange various crosspieces in mutually staggered arrangement as well as crosspieces having a radially bent form or crosspieces having a bent paddlewheel-shaped form between two ring discs of a friction ring.

According to a further advantageous embodiment of the invention, it is provided that the cylindrical sections of the threaded bolts are inserted with play into the holding sections of the friction ring. In this way, a low-warping and floating mounting of the friction ring is afforded in relation to the brake-disc chamber, because the friction ring, depending on the local thermal expansions, can move freely in the radial direction, at least slightly, with respect to the holding bolts.

An internally ventilated friction ring has two ring discs, which have connecting crosspieces lying between them so as to form cooling ducts. Preferably provided between these two ring discs adjacent to their inner circumference are holding sections, which take up the cylindrical section of the threaded bolts. In this way, the holding sections can be integrated in the friction ring in a simple manner in terms of manufacturing engineering. The threaded bolts engage in a central axis of the friction ring in order to prevent shielding. Thermal expansions can occur uniformly in the friction ring without leading to warping. In addition, a uniform application of force between the friction ring and the brake-disc chamber is made possible.

The holding sections preferably take the form of blind holes. In this way, it is ensured that the free motion of the cylindrical section of the threaded bolt is retained in the holding section and is not affected due to any brake dust or other contamination and that the floating mounting is not impaired.

The threaded bolt for fastening the friction ring to the brake-disc chamber advantageously has a diameter of its cylindrical section that is designed to be equal in size or smaller than the distance between the ring discs. In this way, the ring discs, in particular the inner-lying wall sections, can have an equal wall thickness in the circumferential direction, which results in an improvement in the braking or warping properties of the brake disc.

According to a further advantageous embodiment of the invention, it is provided that the threaded bolts are arranged around the circumference of the fastening section at equally spaced intervals. In this way, it is ensured that there is a homogeneous transmission of force and a uniform load between the friction ring and the brake-disc chamber.

An uneven number of through-holes for the threaded bolts or the holding sections is preferably provided, so that, in relation to the axis of rotation, symmetries that can lead to detrimental heat expansions during mechanical load are prevented.

For a more secure transmission of mechanical loads from the friction ring onto the brake-disc chamber as well as for accommodating high thermal loads, for example, of up to 500° C. or 600° C., the threaded bolts are constructed of a heat-resistant steel, a high-temperature steel, or a refractory steel.

The threaded bolts preferably have a threaded section that takes the form of a fine thread. In this way, it is possible to enable a high force transmission for short dimensions of engagement with little thread pitch. These short threaded sections are provided for minimizing the masses moved as well as for reducing weight.

Preferably, the threaded bolts are fastened with a defined pretension force and with a defined extracting procedure. As a tightening procedure, it is possible to use an angle-controlled procedure, a yield-point procedure, or a torque-limited procedure. The limiting of a tightening torque for the threaded bolts makes it possible to achieve a secure fixing in place of the bolt without overloading the threaded bolts in order to ensure the security of the connection between the friction ring and the brake-disc chamber and to prevent a spontaneous loosening due to jolts and loads.

The annular gap created between the friction ring and the brake-disc chamber is designed to be larger than the maximum change in the inner diameter of the friction ring and in the outer diameter of the brake-disc chamber during thermal loads. In this way, it is ensured that, during high thermal loads, the friction ring is not seated with its inner circumference on the outer circumference of the brake-disc chamber, which would otherwise prevent the floating mounting.

BRIEF DESCRIPTION OF THE DRAWINGS

The invention as well as further advantageous embodiments and enhancements of it are described in greater detail and explained below on the basis of the examples depicted in the drawings. The features to be taken from the description and the drawings can be employed individually in themselves or several at once in any combination in accordance with the invention. Shown therein are.

DETAILED DESCRIPTION OF THE INVENTION

Figure 1:
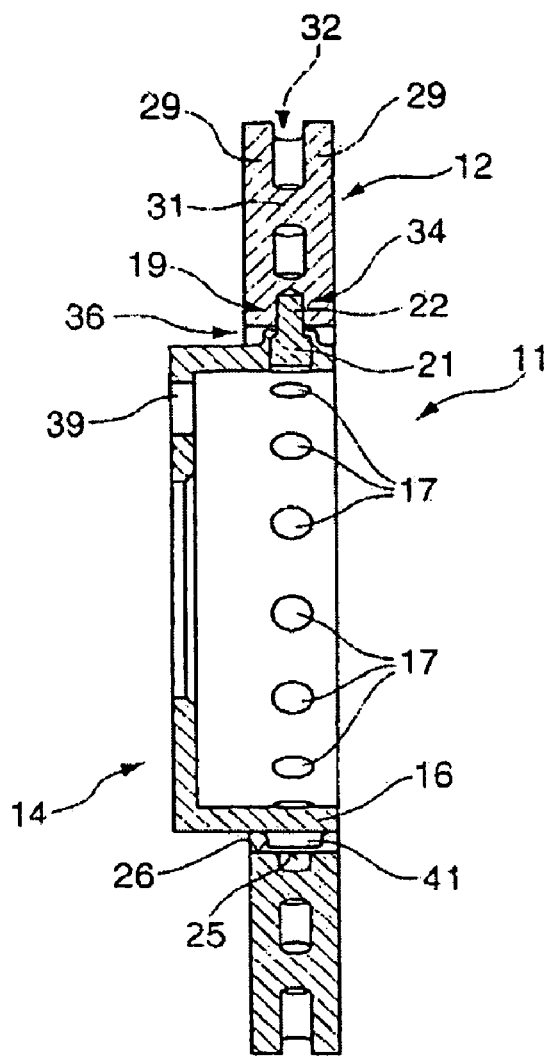
FIG. 1 a schematic sectional depiction of a brake disc in accordance with the invention, FIG. 2 a schematic side view of the brake disc according to FIG. 1, FIG. 3 an enlarged depiction of a side view of a brake-disc chamber, and FIG. 4 a schematic side view of a threaded bolt.
Figure 2:
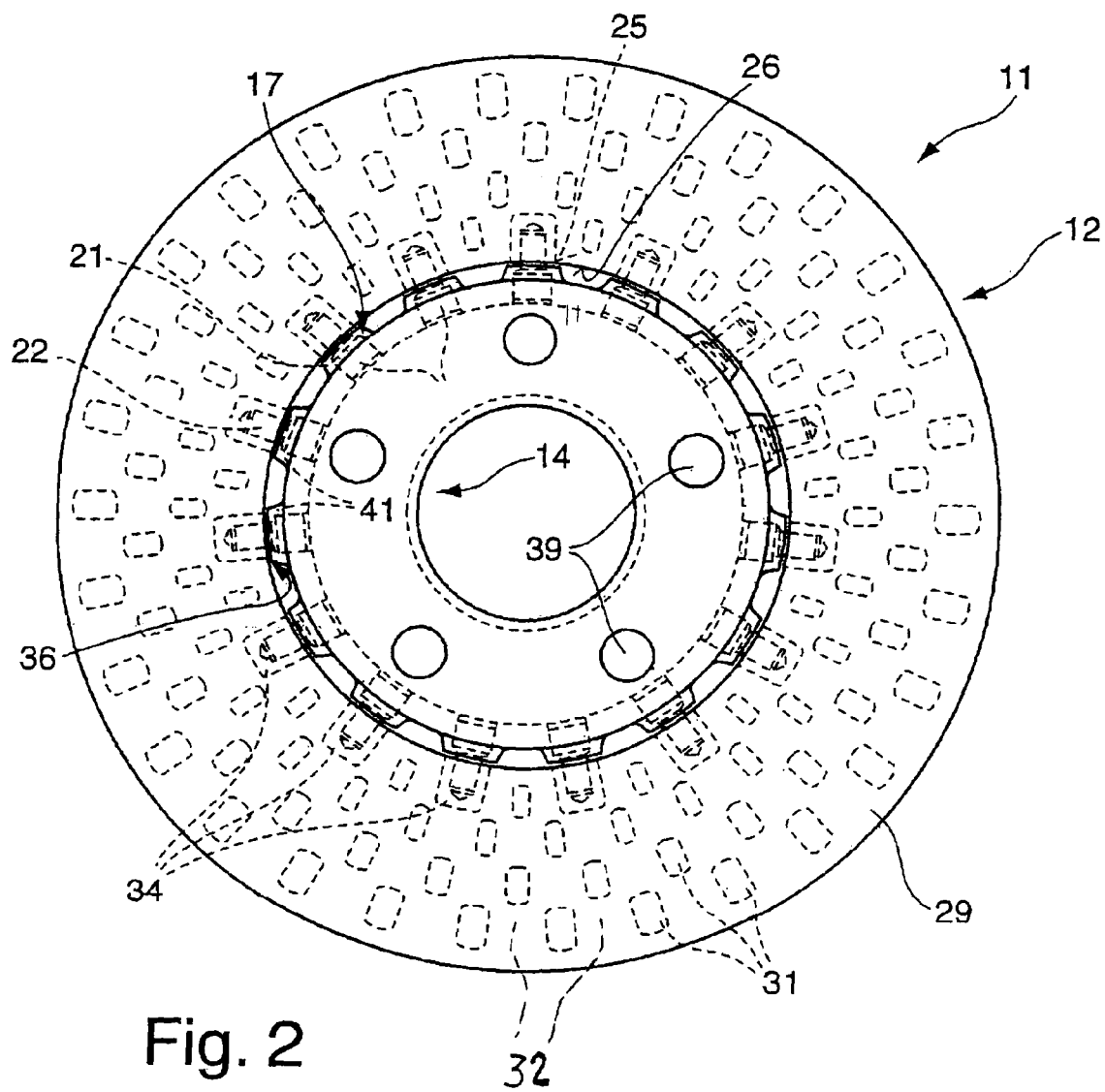

Depicted in FIG. 1, in a schematic full cross section, is a brake disc 11 of the invention. FIG. 2 shows a schematic side view of the brake disc 11 of the invention according to FIG. 1. Brake discs of this type are employed in motor vehicles.

Figure 4:
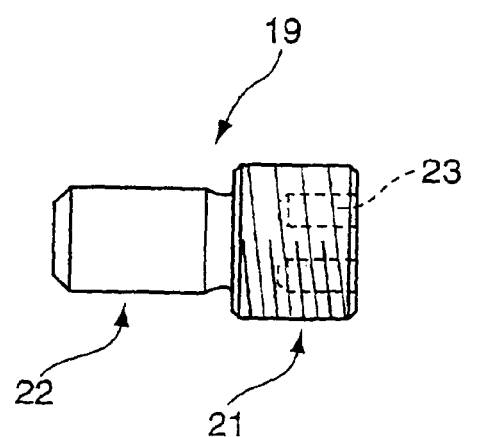

The brake disc 11 comprises a friction ring 12, which is connected to a brake disk chamber 14 in a rotationally fixed manner, but is mounted in a floating manner radially and axially. The brake disc 11 is fastened to a wheel hub via the brake-disc chamber 14. The brake-disc chamber 14 has a cylindrical fastening section 16 on which a number of through-holes 17 are provided, advantageously distributed uniformly over the circumference, for receiving threaded bolts 19. As is depicted in greater detail in FIG. 4, threaded bolts 19 of this type have, a terminal threaded section 21 and a cylindrical section 22. For mounting and dismounting of the threaded bolts 19, recesses 23 are introduced on the threaded section 21 in order to manipulate the threaded bolts 19 using a tool.

A section of an outer circumference 25 of the fastening section 16 arranged on the brake-disc chamber 14 is overlapped by an inner circumference 26 of the friction ring 12, the friction ring 12 being held in relation to the brake-disc chamber 14 by the threaded bolts 19 arranged in the fastening section 16. The friction ring 12 has two annular discs 29, which are mutually spaced by crosspieces 31. Lying in between, cooling ducts 32 are formed for an internally ventilated friction ring 12.

The threaded bolt 19, inserted into the through-hole 17 on the fastening section 16 from the inside toward the outside, is fastened via a thread in the through-hole 17. The cylindrical section 22 of the threaded bolt 19 penetrates the through-hole 17 in the radial direction and engages in a holding section 34 of the friction ring 12, which is preferably provided adjacent to it on the inner circumference 26 of the friction ring 12. This holding section 34 involves a blind hole, which is formed between the annular discs 29. The threaded bolt 19 engages, preferably in a plane of symmetry of the friction ring 12, in the holding section 34, which has a diameter that is preferably of equal size or smaller than the distance between the annular discs 29 or the inner surfaces of the annular discs 29 that form the cooling ducts 32.

The large number of threaded bolts 19 results in a holding of the friction ring 12 with an equally large annular gap 36 in relation to the outer circumference 25 of the fastening section 16 on the brake-disc chamber 14. The arrangement of the threaded bolts 19 with play in relation to the holding section 34 results in a self-centering taking place. By means of the threaded section 22, the threaded bolts 19 are held in a defined position in relation to the brake-disc chamber 14, an allowable tightening torque being preferably applied. This prevents a spontaneous loosening due to vibrations or other mechanical and/or thermal loads.

The friction ring 12 depicted in FIG. 2 has pillar-like crosspieces 31, which are designed to be smaller in terms of their surface dimensions on going from the outside toward the inside. For example, four rows of crosspieces 31, arranged in a circular pattern, are provided, each of which is arranged at gaps in relation to the neighboring row of crosspieces 31. This enables a uniform and high circulation of air for cooling to be achieved. Beyond this, so-called thermal hot spots, which can arise in the junction between the crosspieces 31 and the annular discs 29 and can lead to nonuniform thermal expansions during thermal loads, are reduced to a substantial extent. The cross-sectional geometry of the crosspieces 31 can take a nearly rectangular form with rounded corners, as is depicted in FIG. 2. Further geometries, such as, for example, square, polygonal base surfaces as well as oval, elliptical, or kidney-shaped cross sections, can also be provided.

The friction ring 12 is constructed of cast iron or ceramic. The brake-disc chamber 14 is produced from gray cast iron, from an aluminum alloy, or from drawing steel.

Figure 3:
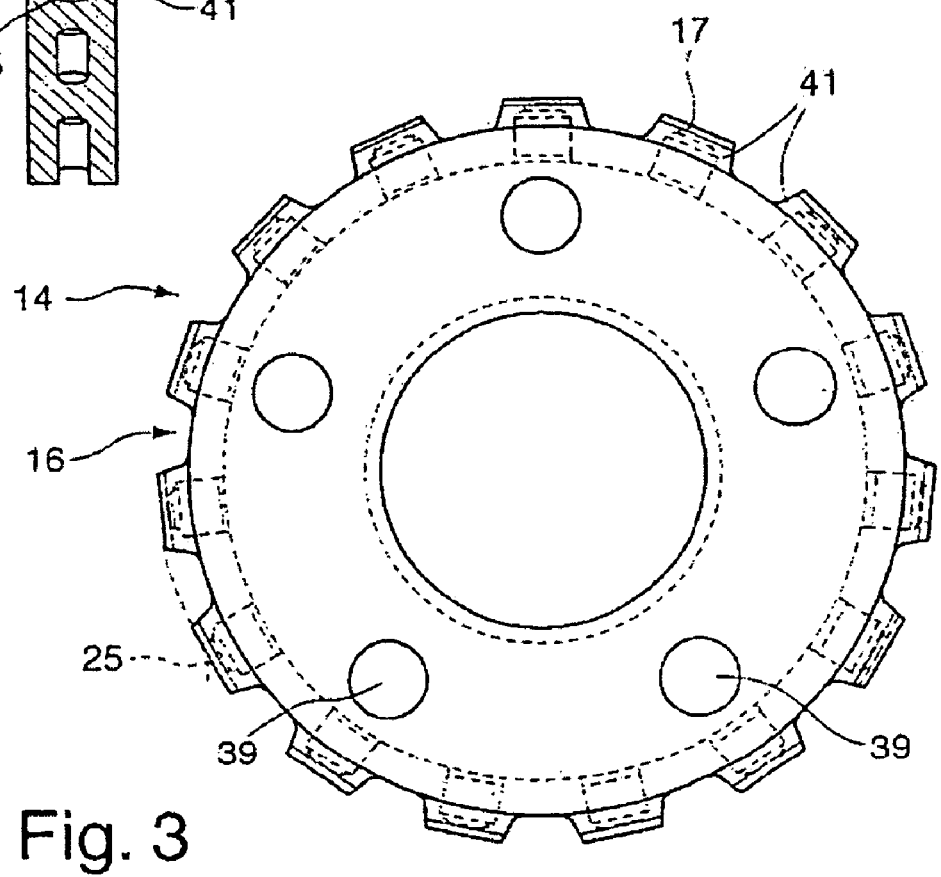

Shown schematically in FIG. 3 in enlargement is a brake-disc chamber 14 in side view. The holes 39 arranged on a face serve for attaching fastening screws to a wheel hub in order to fix the brake disc 11 in position on it. Formed on the outer circumference 25 of the fastening section 16 are hump-shaped sections 41, each of which comprises a through-hole 17. The faces of the hump-shaped sections 41 lie in a common outer diameter and constitute the outer circumference 25. This outer circumference is smaller than the inner diameter in which the inner circumference 26 of the friction ring 12 lies or vice versa, so that the annular gap 36 is created and, during mechanical and thermal loads on the brake disc 11, it is ensured that these faces do not run to a dead stop or rest against each other or are pressed against each other under tension due to heat expansion. These hump-shaped sections 41 serve, furthermore, to make possible an adequate strength for the fine threads introduced into the through-hole 17 for receiving the threaded sections 21 of the threaded screws 19.

Recesses, which are created by round junctions, are provided between the hump-shaped sections 41 for reducing the weight of the brake-disc chamber 14.

The through-holes 17 on the brake-disc chamber 14 are provided uniformly over the circumference, but preferably asymmetrically with respect to one another. In this way, uniform thermal expansions can be achieved during thermal loads. In addition, it is thereby possible to support the self-centering uptake of the friction ring 12 via the threaded bolts 19 in relation to the brake-disc chamber 14.

This brake disc 11 of the invention has the advantage that, without additionally required structural space, a two-part brake disc 11 with a friction ring 12 mounted in a floating manner is created. This makes possible, in addition, an easy replacement of the friction ring 12 as well as the mounting of different diameters or thicknesses of the friction ring 12 on the same brake-disc chamber 14.

All features are essential to the invention in themselves and can be combined with one another in any way.

The invention claimed is:

1. An internally ventilated brake disc, having at least one friction ring, which is connected to a brake-disc chamber via fastening elements and take up the friction ring so as to form an annular gap with respect to the brake-disc chamber, which has a cylindrical fastening section with several through-holes, so that, between an outer circumference of the fastening section and an inner circumference of the friction ring, the annular gap is formed, which is larger than a maximum change in the inner circumference of the friction ring and in the outer circumference of the fastening section that is afforded at least by thermal or mechanical load, characterized in that the friction ring is replaceably mounted to the brake-disc chamber by the fastening elements which take the form of threaded bolts, each having a cylindrical section and a threaded section, the threaded bolts being inserted into these through-holes of the brake-disc chamber from the inside of the brake-disc chamber toward the outside and being screwed into the brake-disc chamber in such a way that the cylindrical sections of the threaded bolts extend outward in the radial force direction over an outer circumference of the brake-disc chamber and that the cylindrical sections of the threaded bolts are guided with play in holding sections of the friction ring and that the threaded bolts are fastened in the through-holes of the brake-disc chamber.

2. The brake disc according to claim 1, further characterized in that the friction ring has two annular discs, which are mutually spaced with connecting crosspieces so as to form an internally ventilated brake disc and in which the holding sections are provided between the annular discs, lying adjacent to their inner circumference.

3. The brake disc according to claim 1, further characterized in that the holding sections are designed as blind holes.

4. The brake disc according to claim 1, further characterized in that a diameter of the cylindrical section of the threaded bolts is designed to be of equal size or smaller than the separation between two annular discs of the friction ring.

5. The brake disc according to claim 1, further characterized in that the threaded bolts are arranged uniformly over the outer circumference, spaced with respect to one another, on the fastening section.

6. The brake disc according to claim 1, further characterized in that an uneven number of through-holes are provided for taking up the threaded bolts.

7. The brake disc according to claim 1, further characterized in that the threaded bolts consist of a heat-resistant steel, a high-temperature steel, or a refractory steel.

8. The brake disc according to claim 1, further characterized in that the threaded section of the threaded bolts is designed as a fine thread.

9. The brake disc according to claim 1, further characterized in that the threaded bolts are fastened with a defined pretension force to the brake-disc chamber.

10. An internally ventilated brake disc, having at least one friction ring, which is connected to a brake-disc chamber via fastening elements and take up the friction ring so as to form an annular gap with respect to the brake-disc chamber, which has a cylindrical fastening section with several through-holes extending so that, between an outer circumference of the fastening section and an inner circumference of the friction ring, the annular gap is formed, which is larger than a maximum change in the inner circumference of the friction ring and in the outer circumference of the fastening section that is afforded at least by thermal or mechanical load, characterized in that the fastening elements take the form of threaded bolts, each having a cylindrical section and a threaded section, the threaded bolts being removably mounted in the through-holes of the brake-disc chamber through the inside ends of the through-holes and being screwed into the brake-disc chamber in such a way that the cylindrical sections of the threaded bolts extend outward in the radial force direction over an outer circumference of the brake-disc chamber and that the cylindrical sections of the threaded bolts are guided with play in holding sections of the friction ring and that the threaded bolts are fastened in the through-holes of the brake-disc chamber.

* * * * *